May 17, 1960

G. W. ONKSEN ET AL 2,937,250

HERMETICALLY SEALED RELAY

Filed July 7, 1958

INVENTORS
George W. Onksen
Charles W. Miller
William E. Griner
Robert A. Martin
Kenneth R. Skinner

BY

Their Attorney

United States Patent Office 2,937,250
Patented May 17, 1960

2,937,250

HERMETICALLY SEALED RELAY

George W. Onksen and Charles W. Miller, Anderson, William E. Griner, Pendleton, Robert A. Martin, Noblesville, and Kenneth R. Skinner, Anderson, Ind., assignors to General Motors Corporation, Detroit, Mich., a corporation of Delaware Application July 7, 1958, Serial No. 746,922

9 Claims. (Cl. 200—87)

This invention relates to hermetically sealed switching apparatus and to a method of fabricating a hermetically sealed switch.

One of the objects of this invention is to seal off the parts of an electric switch by encasing the switch parts in a housing that is formed of two mating imperforate parts and wherein the joint formed by the two mating parts is sealed by a quantity of epoxy resin that contacts the inner sides of the two parts and which takes the form of a fillet that extends coextensively with the joint formed by the mating edges of the two parts. The epoxy resin material fills all cracks and spaces located between the parts of the housing and thus forms an effective hermetic seal.

Another object of this invention is to provide a method of hermetically sealing an electric switch of the type having a two-part housing or casing enclosing the switching parts, the steps including, placing a quantity of epoxy resin in its uncured state in the housing, securing the two housing parts together and then heating the switch assembly to a temperature and for a period of time sufficient to cure the epoxy resin and to force the resin under the pressure of heated air within the housing into any cracks and crevices formed at the joint of the two-part housing. It will be apparent that this process contemplates sealing the relay by forcing epoxy resin outwardly through any cracks formed between the two-part housing.

Still another object of this invention is to provide a method of hermetically sealing an electric switch of the type having a two-part housing or casing enclosing the switching parts, which includes, freezing a quantity of uncured epoxy resin, supporting the frozen epoxy resin on one of the housing parts, securing the housing parts together and then heating the switch assembly to a temperature and for a period of time sufficient to melt and subsequently cure the epoxy resin and to force the resin, while flowable, under the pressure of heated air within the housing into any cracks and crevices formed at the joint of the two-part housing. The freezing of the epoxy resin facilitates the handling of the resin during fabrication of the relay.

A further object of this invention is to provide an electromagnetic relay having an actuating coil assembly that includes a coil winding and a core, the top end of the core being fitted with an annular resilient member that is contacted by the armature of the relay when it is attracted toward the top end of the core. The provision of the annular resilient member dampens the noise of the armature contacting the core.

Further objects and advantages of the present invention will be apparent from the following description, reference being had to the accompanying drawings wherein preferred embodiments of the present invention are clearly shown.

Figure 1:
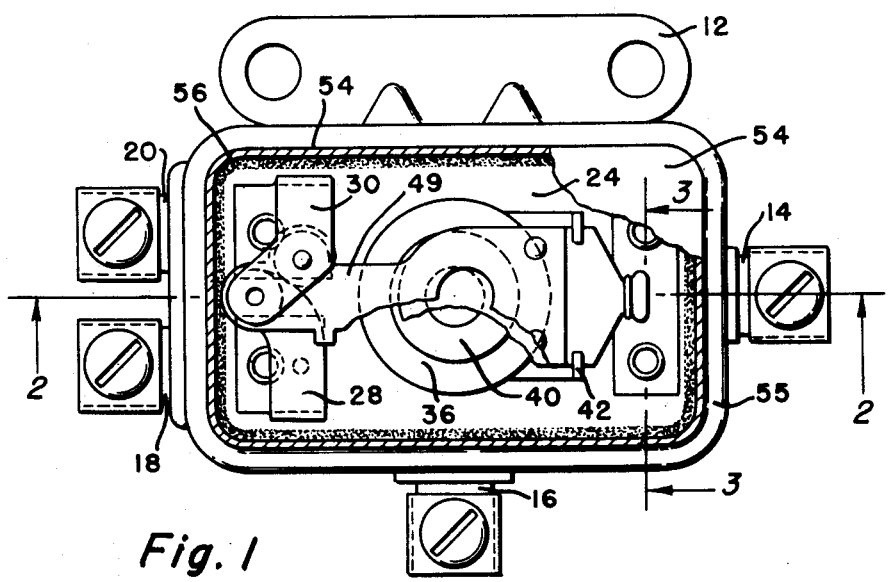
Figure 1 is a top view with parts broken away of a relay made in accordance with this invention.
Figure 2:
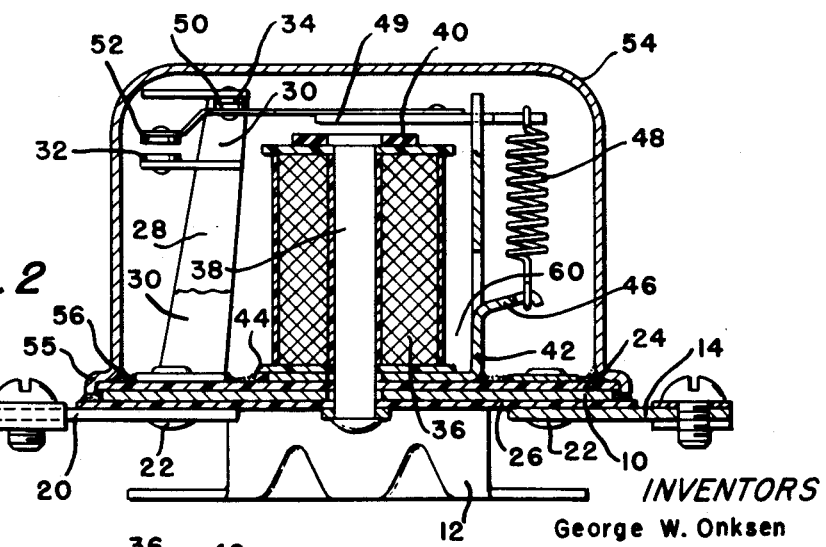
Figure 2 is a sectional view taken along line 2—2 of Figure 1.

Referring now to the drawings and more particularly to Figures 1 and 2, the relay of this invention comprises a base 10 carrying bracket 12 which is adapted to be secured to a support. The base 10 carries a plurality of terminals 14, 16, 18 and 20 which are positioned as shown and which are held to the base by a plurality of rivets 22. The rivets, in addition to holding the terminals to the base, fix the sheets 24 and 26, formed of insulating material, to the base. The rivets 22 also fix upstanding terminal brackets 28 and 30 to the base 10. The terminal bracket 28 carries an electrical contact 32 whereas the terminal bracket 30 carries an electrical contact 34. The terminal bracket 30 is electrically connected with terminal 20 whereas the terminal bracket 28 is electrically connected with terminal 18. The terminal 14 is preferably connected to one side of an actuating coil 36 that forms a part of the actuating coil assembly of the relay. The opposite side of actuating coil 36 is preferably connected directly to the base 10 whereas terminal 16 is connected with the metal core 38 of the actuating coil assembly of the relay.

The actuating coil assembly of the relay includes the coil winding 36 and the metal core 38, the lower end of the core being peened over to secure terminal 16 to the underside of insulating sheet 26. The top end of core 38 is encircled by an annular resilient member 40 that may be formed of rubber or the like. The actuating coil 36 is suitably insulated from the core 38 and from an L-shaped bracket 42 having one leg positioned between insulating sheet 24 and insulating sheet 26. The L-shaped bracket 42 is held in place by the core member 38 and has an integral lug portion 46 that engages one end of a spring 48. The L-shaped bracket 42 pivotally supports an armature 49 having one end thereof connected with spring 48. The armature 49 rests in a transversely extending slot formed in the top end of bracket 42 and pivots on the lower edge of the slot. The armature 49 carries electrical contacts 50 and 52 which cooperate respectively with contacts 34 and 32.

Figure 3:
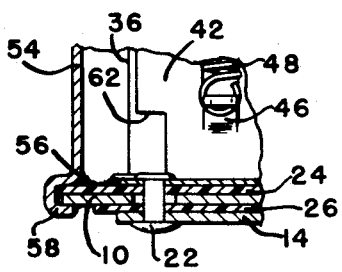
Figure 3 is a sectional view taken along line 3—3 of Figure 1.

The relay switch structure just described is enclosed by a cover 54 having four lugs 58, one of which is shown in Figure 3, that are clinched over the underside of the base of the relay so as to contact the base 10. The cover 54 has a flanged portion 55 that fits over the insulating layer 24 and may be fitted with suitable sound insulating material to reduce noise of operation of the relay. The cover is imperforate as is the base of the relay and these two parts are hermetically sealed by a quantity of epoxy resin 56 which extends coextensively with the joint formed by the cover and base and which takes the form of a narrow fillet as is better shown in Figure 2. The epoxy resin forms a very effective hermetic seal and operates to exclude any foreign matter that would be injurious to the switching parts of the relay.

As examples of formulations that may be used, the following are set forth.

*Example I*

An epoxy resin having an equivalent weight of 65 is mixed with a suitable hardener such as dodecenyl succinnic anhydride. One hundred parts of hardener are used with 106 parts of the epoxy resin. The mixture preferably should be cured for four hours at 100° C.

*Example II*

An epoxy resin having an equivalent weight of 85 may be used with a hardener of diethylenetriamine. In this formulation, 10 parts of the diethylenetriamine are used for each 100 parts of epoxy resin. The preferred cure time is two hours at 100° C. and two hours at 150° C.

Example III

The same epoxy resin disclosed in Example II and having an equivalent weight of 85 can be cured with a hardener of hexahydrophthalic. This hardener is used in proportions of 170 parts of hardener to 100 parts of epoxy resin. Cure time for this last formulation is recommended at four hours at 100° C.

In all examples, the parts used are expressed as parts by weight. The equivalent weight may be defined as the number of grams of resin required to esterify one gram molecular weight of a monobasic acid. In other words, it would require 65 grams of the resin to esterify one gram molecular weight of acetic acid.

In each case, the epoxy resin is well known commercially and is a mixture of bisphenyl A and epichlorohydrin.

The method of sealing the relay includes the steps of, first, preparing an epoxy resin-hardener mixture as heretofore described in Examples I, II or III. The epoxy resin and hardener are mixed in the proportions just described and, during the mixing operation, are heated to approximately 75° C. while simultaneously deairing the mixture under vacuum. A quantity of the resin is then applied to the top surface of insulating sheet 24, this, of course, being before the cover 54 is clamped to the base. After the epoxy resin is placed on the top of insulating sheet 24, the base is inverted from its position in Figure 2 and the cover 54 is secured to the base by clinching over the lugs 56. During the clinching operation, the base is suitably supported and the lugs 56 are then clinched downwardly to tightly secure the cover to the base. It is preferred that the switch assembly be in this inverted position during the clinching operation as it greatly facilitates this step of the method. After the cover 54 has been mechanically secured to the base 10, the relay is moved back to its upright position of Figure 2 and is placed in a suitable curing oven. The entire switch assembly is then heated in this oven for a period of time as indicated above in describing the formulation of the various epoxy resin compounds. Thus, for the first described epoxy resin compound, the switch apparatus would be heated for four hours at 100° C. It will be appreciated that, during this heating operation, the residual air contained within the chamber formed by the base 10 and cover 54 is heated and expands. The epoxy resin is likewise heated and becomes flowable whereby the expanding air forces the epoxy resin outwardly through any cracks and crevices located between the lower end of cover 54 and the base of the relay. The epoxy resin will also be forced into any cracks or crevices that might be located in the insulating sheet 24 although the concentration of the resin is primarily along the areas indicated by reference numeral 56 and forms a thin fillet as is better shown in Figure 2.

The process just described must be performed quite rapidly, as the epoxy resin compounds are rather fluid and will run onto the relay contacts, etc., as quickly as two minutes, once the assembly has been inverted. This means that, with the process just described, the insulating base 10 must be inverted, the cover clinched thereto, and the switch assembly brought back to the position of Figure 2 in approximately two minutes to prevent the material from running onto the contacts, etc., impairing the function of the relay.

In order to reduce the criticality of the method just described, it has been found that the epoxy resin may be frozen after it has been mixed with the hardener to reduce the reaction time of the resin. In this variation, the epoxy resin is first mixed with a hardener as described above without heating. A predetermined quantity of the mixture is then frozen and is placed on the top edge of insulating sheet 24 when the base is in the position shown in Figure 2. The frozen quantity of epoxy resin may be wedged between the coil 36 and the L-shaped bracket 42 in the area designated by reference numeral 60 or it may be forced under a cut-out portion 62 of L-shaped bracket 42. The base 10 is then inverted from its position shown in Figure 2 and the cover is clinched thereto by supporting the cover in a horizontal position and then by clinching over the lugs 56 by a suitable press or the like.

After the cover is clinched to the base 10, the entire assembly containing the frozen quantity of epoxy resin is moved back to its position of Figure 2 and the assembly is then placed within a curing oven and heated to a suitable temperature for a sufficient period of time to melt the resin and cure the same. The time and temperature of the heating step will, of course, vary with the formulation of the epoxy resin composition as has been set forth above. In this method, the resin is once more forced outwardly through any cracks and crevices formed by the cover 54 and base 10 by the expansion of heated air. The resin, of course, will also fill any cracks or crevices formed in insulating sheet 24 to form a complete hermetic seal for the relay apparatus.

While the embodiments of the present invention as herein disclosed constitute preferred forms, it is to be understood that other forms might be adopted.

What is claimed is as follows:

1. In a method of hermetically sealing an electric switch having a base and a cover, the steps including; freezing a quantity of uncured epoxy resin, placing the frozen quantity of epoxy resin on said base, fixing the cover of said switch to said base to form a chamber containing the frozen quantity of epoxy resin, and heating said switch to a temperature and for a period of time sufficient to melt and cure the quantity of resin contained therein, said resin during said heating operation being forced into any spaces or cracks located between the cover and base by the outward expansion of heated air in said chamber.

2. In a method of hermetically sealing an electric switch having a base and a cover formed with extensions that are adapted to be crimped over the base to hold the cover to the base, the steps including; freezing a quantity of uncured epoxy resin, placing the frozen quantity of epoxy resin on said base, crimping said extensions over said base to secure said cover to said base and thereby form a chamber containing the frozen quantity of epoxy resin and heating said switch to a temperature and for a time sufficient to melt and cure the quantity of resin contained therein, said resin during said heating operation being forced into any spaces or cracks located between the cover and base by the outward expansion of heated air in said chamber.

3. In a method of hermetically sealing an electric switch having first and second members that are adapted to be secured together to form a sealed switching chamber; the steps including; freezing a quantity of uncured epoxy resin, placing the frozen quantity of epoxy resin on one of said members, fixing the two members together to form a chamber containing the frozen quantity of epoxy resin, and heating said assembled members to a temperature and for a period of time sufficient to melt and cure the quantity of resin contained therein, said resin during said heating operation being forced into any spaces or cracks located between said members by the outward expansion of heated air in said chamber.

4. In a method of hermetically sealing a chamber including first and second members that are disposed to form a sealed chamber containing electrical apparatus, the steps including; placing a quantity of uncured epoxy resin on one of said members, holding said members together to form a chamber containing the quantity of epoxy resin, and heating the assembled members to a temperature and for a period of time sufficient to cure the quantity of resin contained therein, said resin during said heating operation being forced into any spaces or cracks located between said members by the outward expansion of heated air in said chamber.

5. In a method of hermetically sealing an electromagnetic relay of the type having a base, cover and switch contacts and wherein the base supports a coil assembly that is adapted to attract an armature for operating one of the switch contacts, said cover having a plurality of lugs that are adapted to be crimped over the base, the steps including; freezing a quantity of uncured epoxy resin, placing the frozen quantity of epoxy resin on said base while said base is in an upright position, inverting said base and securing said cover to said base by crimping said lugs over the base, moving the assembled base and cover back to an upright position, and heating the assembly to a temperature and for a time sufficient to melt and cure the quantity of resin contained therein, said resin during said heating operation being forced into any spaces or cracks located between the cover and base by the outward expansion of heated air contained in the assembly.

6. A hermetically sealed relay comprising; a base, a coil assembly secured to said base, an armature support secured to said base, an armature pivoted to said armature support and carrying an electrical contact, a fixed electrical contact cooperating with the contact carried by the armature, a cover member having an outwardly directed flange engaging said base and having a plurality of lugs crimped over said base for securing said cover to said base, and a quantity of epoxy resin extending coextensively with the joint formed by the inner wall of the cover and the inner edge of the base for hermetically sealing the joint.

7. A hermetically sealed switch comprising; a base member, a cover member secured to said base member to form a chamber, an electric switch in said chamber, and a quantity of epoxy resin extending coextensively with the joint formed by the inner wall of the cover and the inner edge of the base for hermetically sealing the joint.

8. A hermetically sealed switch comprising; a base member, a cover member secured to said base member to form a chamber, an electric switch in said chamber, and a fillet formed of epoxy resin extending coextensively with the joint formed by the inner wall of the cover member and the inner edge of the base member for hermetically sealing the joint.

9. A hermetically sealed relay, comprising; a base, a coil assembly including a metal core and a coil winding supported from said base, an armature carrying an electrical contact pivotally supported for movement toward and away from the top end of said core, a fixed contact adapted to be engaged by the contact carried by the armature, an annular member formed of resilient material encircling the top end of said core and positioned to be contacted by said armature, when said armature is pulled toward the core by magnetic attraction, a cover member secured to said base, and a fillet formed of epoxy resin extending coextensively with the joint formed by the inner wall of the cover member and the inner edge of the base member for hermetically sealing the joint.

References Cited in the file of this patent

UNITED STATES PATENTS

| | | |
|---|---|---|
| 629,645 | Baynard | July 25, 1899 |
| 1,026,003 | Stecker | May 14, 1912 |
| 2,048,623 | Redinger | July 21, 1936 |
| 2,377,265 | Rady | May 29, 1945 |
| 2,528,932 | Wiles et al. | Nov. 7, 1950 |
| 2,667,553 | Moorhead et al. | Jan. 26, 1954 |